United States Patent [19]

Holleck et al.

[11] Patent Number: 4,911,996
[45] Date of Patent: Mar. 27, 1990

[54] ELECTROCHEMICAL CELL

[75] Inventors: Gerhard L. Holleck, Wayland; Trung Nguyen, Norton, both of Mass.

[73] Assignee: EIC Laboratories, Inc., Norwood, Mass.

[21] Appl. No.: 167,013

[22] Filed: Mar. 11, 1988

[51] Int. Cl.$^4$ .......................................... H01M 10/40
[52] U.S. Cl. ...................................... 429/194; 429/218
[58] Field of Search ............... 429/218, 224, 219, 232, 429/194, 195, 197

[56] References Cited

U.S. PATENT DOCUMENTS

| | | | |
|---|---|---|---|
| 2,820,730 | 1/1958 | Grulke et al. | 429/224 |
| 4,091,191 | 5/1978 | Gaines | 429/194 |
| 4,237,204 | 12/1980 | Thompson et al. | 429/194 |
| 4,576,883 | 3/1986 | Hope et al. | 429/218 |

Primary Examiner—Donald L. Walton
Attorney, Agent, or Firm—Fish & Richardson

[57] ABSTRACT

A rechargeable electrochemical cell with an electrolyte and anode has a cathode including an active cathode material with a surface at which at least one side reaction occurs during a normal discharge cycle of the cell. The outer surface of the cathode material includes a protective coating that inhibits the side reactions without preventing discharge of the cathode.

14 Claims, 4 Drawing Sheets

ELECTROCHEMICAL CELL

FIELD OF THE INVENTION

The present invention pertains to improvements of the capacity and cycle life of lithium/transition metal sulfide batteries, especially at elevated temperatures.

BACKGROUND OF THE INVENTION

A rechargeable, current producing, electrochemical cell has to satisfy many requirements in order to be of practical value. Among the requirements is the capability to operate efficiently at elevated temperatures for many discharge charge cycles.

One attractive class of modern high energy density cells makes use of alkali metal anodes, non-aqueous electrolytes and transition metal sulfide cathodes. The latter are solid compounds which upon reduction incorporate the alkali metal without fundamental structural changes. Examples of such cathode materials are $TiS_2$, $TiS_3$, $MoS_2$, $MoS_3$, $NbS_2$, $NbS_3$, $V_2S_5$, and $V_xCr_{1-x}S_2$. Typical electrolytes include dioxolane, tetrahydrofuran, dimethoxy ethane, and mixtures thereof with $LiAsF_6$ or other lithium salts. The most commonly use anode is Li or a Li alloy. A specific example is a lithium (Li)/2 methyl-tetrahydrofuran (2Me-THF)-tetrahydrofuran (THF)-Lithium hexafluoroarsenate ($LiAsF_6$)/Titanium disulfide ($TiS_2$) cell for which the reaction can be written as follows:

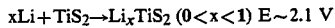

$$xLi + TiS_2 \rightarrow Li_xTiS_2 \ (0<x<1) \ E \sim 2.1 \ V$$

Since $TiS_2$ incorporates Li without fundamental structural changes one expects that such a cathode can be charged and discharged many times with little change in capacity. Furthermore, to the degree that mass transport processes in the electrolyte and/or the cathode limit cell performance, one would expect performance to improve as the operating temperature is increased. However, in practical batteries this expected improvement is often offset by undesirable side reactions. Such side reactions occur in secondary lithium/transition metal chalcogenide cells and they result in markedly shortened cycle life at elevated temperatures.

Cells consisting of a Li anode, a $TiS_2$ cathode and a 2MeTHF/THF/2MeF/$LiAsF_6$ electrolyte show upon initial discharge almost complete cathode reduction, i.e., formation of $Li_xTiS_2$ where $x \sim 1$. In these cells the anode material is provided in excess to the stoichiometric amount needed for cathode reduction. Thus cell performance, is at least initially, determined by the cathode, although the ultimate cycle life may be limited by the anode.

Upon discharge-charge cycling at room temperature ($\sim 25°$ C.), cathode utilization decreases gradually from about 90% in early cycles to $\sim 70\%$ after 80 cycles. Similar test cells cycled at 65° C. degrade in performance much earlier in cycle life. Cycle life at 65° C. is only 12 cycles to 70% cathode utilization.

While the performance described above is typical, it is well known to persons skilled in the art that the exact performance of a cell depends on many parameters including cathode structure, cell assembly and test conditions. However, a similar substantial degradation of cycle life is typically observed at elevated (65°–70° C.) temperatures.

SUMMARY OF THE INVENTION

An important object of the invention is to eliminate the loss of performance at elevated temperatures by modifying the cathode material surface. It has been discovered that this object can be achieved by deposition of a thin metal layer onto titanium disulfide, the metal film being essentially unreactive with the electrolyte during normal cell operation.

It is essential that the metal film be deposited directly onto the cathode material. Mere mixtures of a metal powder with the cathode material do not improve cycle life.

The nature and the scope of the invention will become clearer from the following detailed description when read in connection with the accompanying drawings in which;

Figure 1:
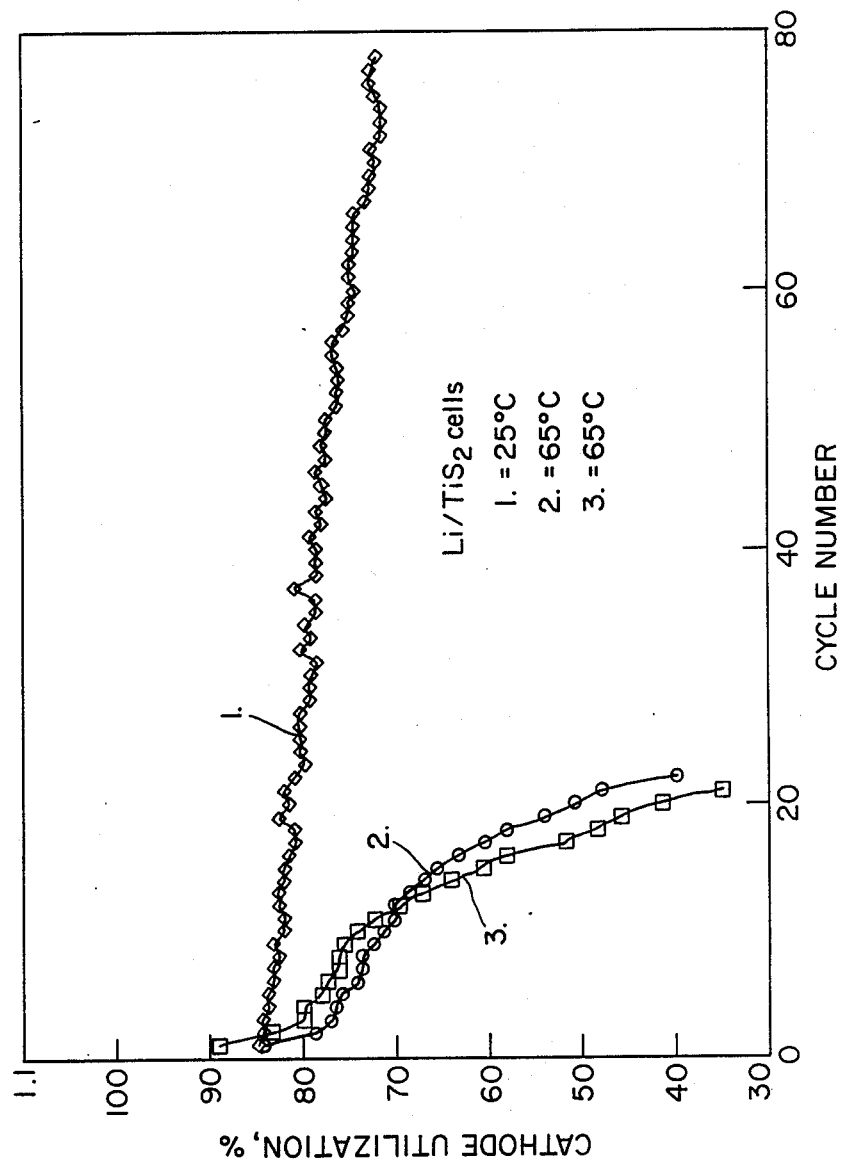
FIG. 1 is a graphical representation of cathode utilization as a function of cycle number for prior art Li-$TiS_2$ cells operated at different temperatures.

With reference now to the drawings, and more particularly FIG. 1 thereof, there is shown a graphical representation of cathode utilization as a function of cycle number for prior art $LiTiS_2$ cells operated at different temperatures showing the degradation of cycle life at 65° C. Consider now the following examples of the invention.

DETAILED DESCRIPTION

EXAMPLE 1

$TiS_2$ powder was coated with a thin layer of aluminum by thermal decomposition of triisobutylaluminum (TIBAL).

Specifically, in one preparation 0.2 cc TIBAL was mixed with 5 cc decane and then 5 g $TiS_2$ was added. The slurry was heated under argon to the boiling point of decane (180°) and held there for 15 min. After cooling the $TiS_2$ was filtered, washed with hexane, and dried. This preparation yielded $TiS_2$ coated with aluminum. Since $TiS_2$ had a specific surface area of about 3 to 4 m$^2$/g this corresponded to a 4 to 6 A° layer, if uniformly distributed.

In another preparation, 5 cc TIBAL was mixed with 5 g $TiS_2$ and the mixture was heated directly to 200° C. for 15 min. After cooling the sample was again washed with hexane. Here the aluminum deposited onto the $TiS_2$ was equivalent to a 100 to 150 A° layer.

The aluminum coated $TiS_2$ was used to prepare cathodes by evenly distributing the powder into a 10 cm$^2$ die containing an expanded nickel mesh and pressing it at 1100 kg/cm$^2$. Cathode capacities were about 170 mAh.

Cells were constructed consisting of one cathode faced on both sides by anodes. The active electrode area was 20 cm$^2$. The anodes consisted of 0.025 cm lithium foil pressed onto an expanded nickel screen. Each electrode was surrounded by a heat sealed microporous polypropylene separator (Celgard 2400). The entire package was sandwiched under moderate compression between stainless steel hemicylinders and inserted into a cylindrical D-size nickel can. The can was then hermetically closed with a cover containing insulated feedthroughs for the electrical connections and a fill tube. The cells were activated by introducing electrolyte consisting of a mixture of tetrahydrofuran (THF), 2 methyl tetrahydrofuran (2MeTHF), 2 methylfuran (2MeF), and 1.5 M LiAsF$_6$.

Figure 2:
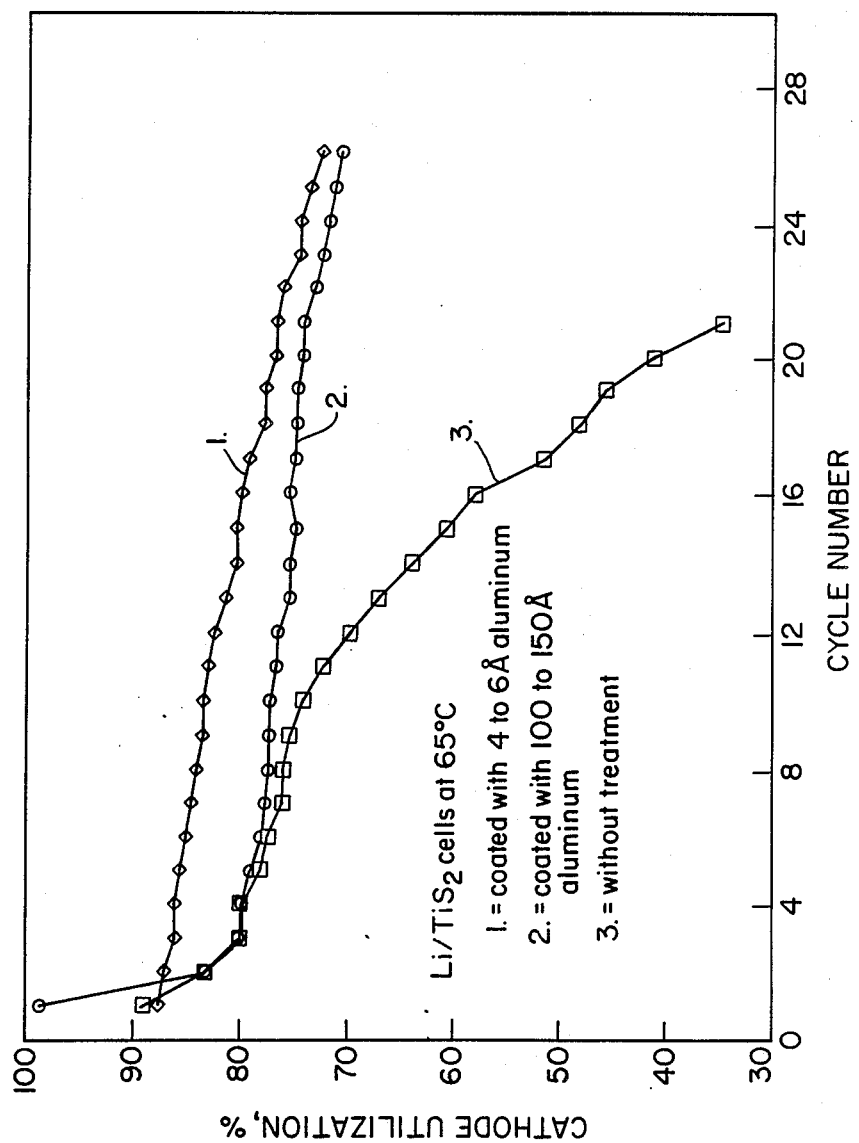
FIGS. 2 and 3 are graphical representations of cathode utilization as a function of cycle number for different Li/$TiS_2$ cells operated at 65° C. illustrating the improvement with the invention.

Cells utilizing cathodes made from each of the aluminum coated TiS$_2$ powders and an identical cell having a cathode prepared from the same lot of TiS$_2$ but without metallization, were placed into a Tenney chamber at 65° C. and discharged at 1.4 mA/cm$^2$ to 1.6 V followed by charge at 0.9 mA/cm$^2$ to 2.8 V. FIG. 2 shows cathode utilization as a function of cycle number. The metallized TiS$_2$ according to the invention clearly outperforms the untreated TiS$_2$.

EXAMPLE 2

A porous TiS$_2$ electrode was prepared by pressing 0.8 g of TiS$_2$ at 1100 kg/cm$^2$ onto an expanded nickel mesh. This electrode was coated with a thin layer of aluminum by electroplating. The electrode was immersed in a plating bath consisting of 1.5M AlCl$_3$ in diethyl ether. It was faced by two aluminum foil anodes. The open circuit voltage was 0.3V. Aluminum deposition was carried out with a constant applied voltage of $-2$ V. The current was initially 0.5 mA/cm$^2$ but quickly dropped to a constant level of about 0.25 mA/cm$^2$. Electroplating was carried out for 3 hours followed by careful washing in diethyl ether to remove all residual AlCl$_3$. This procedure yielded an electrode in which the entire accessible surface area was coated with aluminum equivalent to a 5 to 8 A° layer.

Figure 3:
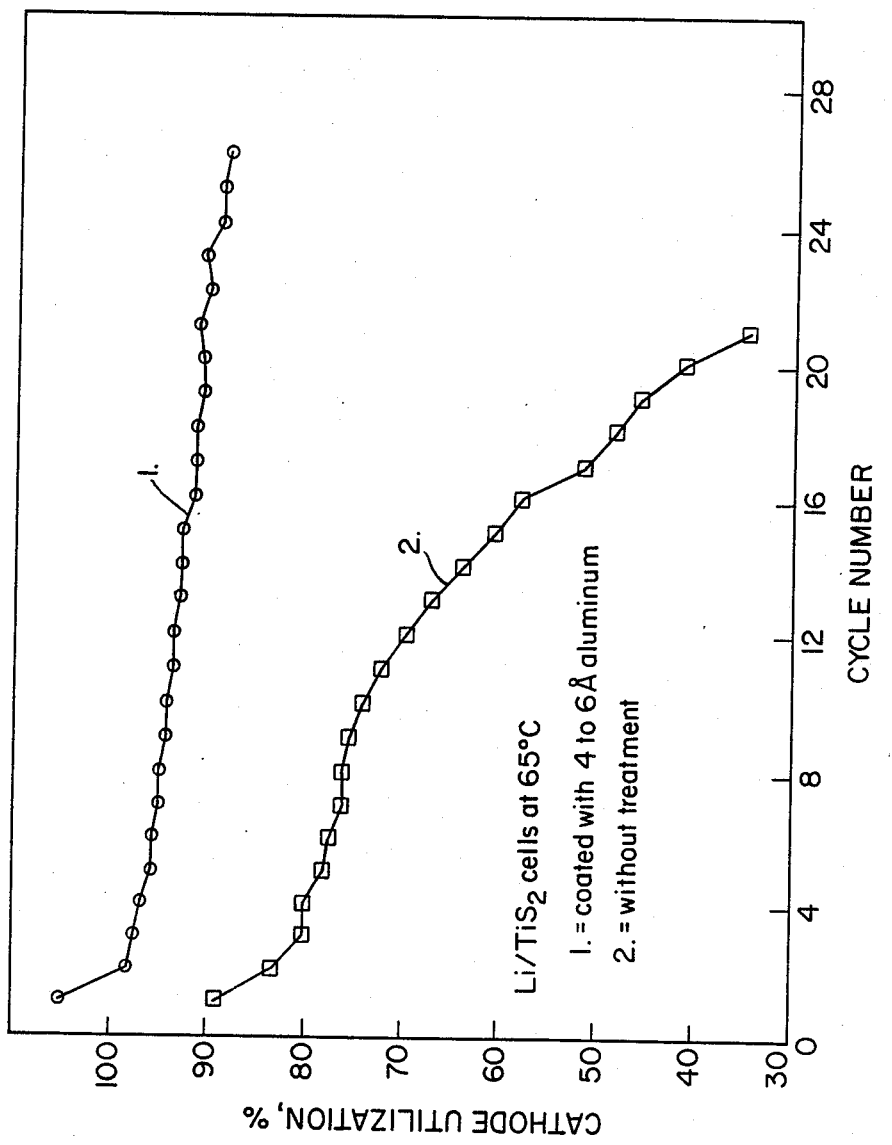

The aluminum coated TiS$_2$ electrode was assembled into a cell and tested by discharge-charge cycling at 65° C. as described in Example 1. The cathode utilization as a function of cycle number is shown in FIG. 3. The performance of an untreated TiS$_2$ electrode is also shown. Again, the cell with a metallized cathode exhibits much better capacity maintenance upon cycling at elevated temperature than cells with cathodes prepared from untreated TiS$_2$.

EXAMPLE 3

Figure 4:
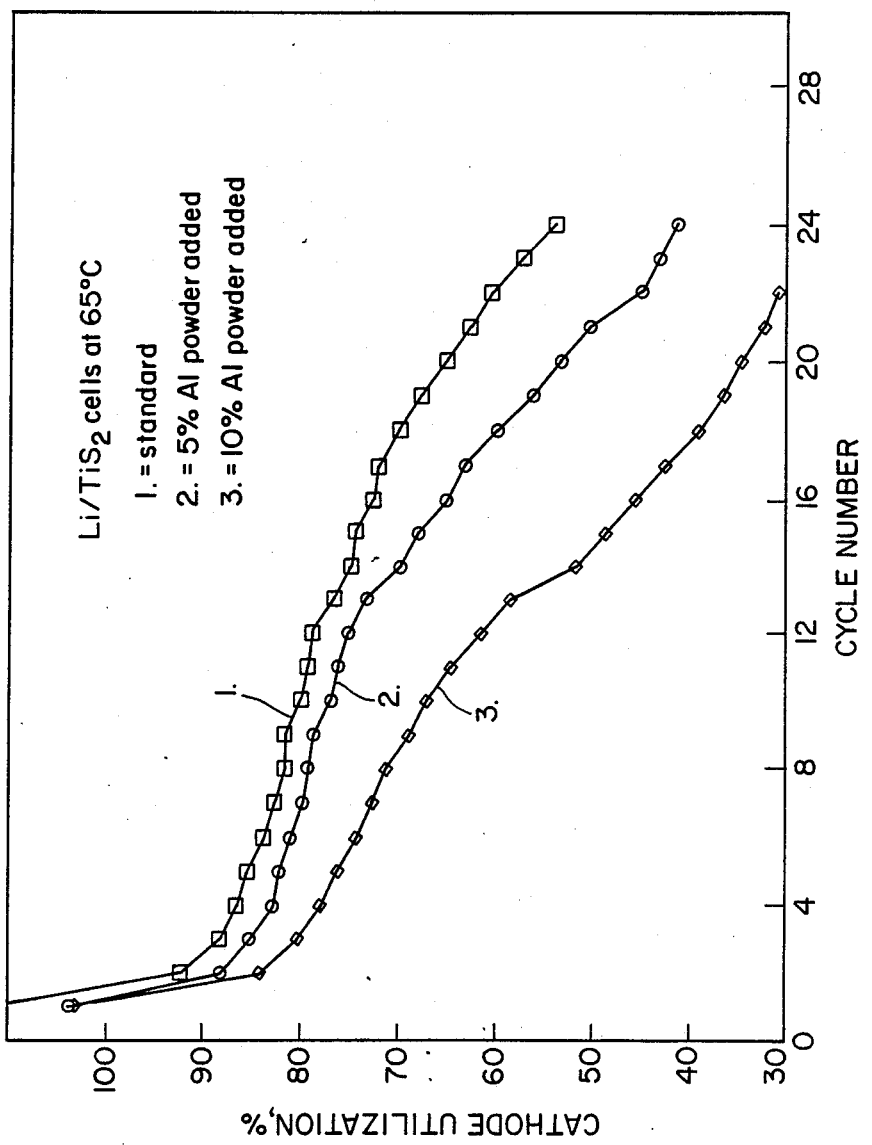
FIG. 4 is a graphical representation of cathode utilization as a function of cycle number for $LiTiS_2$ cells illustrating the degradation that occurs using metal powder mixtures.

To further demonstrate the significance of metallizing the surface of TiS$_2$, cathodes with additions of high surface area metal powders were prepared and tested. Specifically cathodes were prepared from an intimate mix of TiS$_2$ with 5% and 10% fine aluminum powder ($\sim$5 m$^2$/g). Cathode fabrication involved pressing the powder mix with a binder at 1100 kg/cm$^2$ and 120° C. onto an expanded nickel mesh. These electrodes were again incorporated into cells and tested at 65° C. as described in Example 1. Cathode utilization as a function of cycle number is shown in FIG. 4. FIG. 4 shows that mere addition of aluminum powder to the cathode does not lead to improved cell performance.

OTHER EMBODIMENTS

The example presented clearly show that coating TiS$_2$ with aluminum drastically improves the high temperature cycling performance of Li/LiAsF$_6$, THF, 2MeTHF/TiS$_2$ cells. It is believed that this improvement is due to covering the active surface of the TiS$_2$ particles with a less reactive metal surface. Coating by a metal does not prevent access of the intercalating species to the interior crystal lattice sites but does prevent occurrence of undesirable side reactions involving the electrolyte. However, the mere addition of metal powder to the cathode does not improve cycle performance.

It is clear from the examples that the exact procedures for metal deposition and the thickness of the metal layer can be varied widely without losing the performance benefit.

The examples describe a specific cathode and metal. It will be clear, however, to those skilled in the art that the invention is applicable to other transition metal chalcogenide cathode materials and to other metals. Such transition metal chalcogenides include TiS$_3$, MoS$_2$, MoS$_3$, NbS$_2$, NbS$_3$, NbSe$_2$, V$_2$S$_5$ or V$_x$Cr$_{1-x}$S$_2$. Metal coatings may consist of any metal or alloys thereof which are essentially non-reactive with the electrolyte in the operating voltage range of the cathode. Such metals include Mg, Sc, Ti, V, Nb, Cr, Mo, Mn, Fe, Co, Ni, Cu, Ag, Au, Zn, Cd, Al, In, Ge, Sn, Pb, As, and Sb.

It is also clear that the metal coating can be applied to conductive cathode additives which have electrochemically active surfaces. One such material, often used to optimize cathode structures, is carbon.

Other embodiments are within the scope of the appended claims.

What is claimed is:

1. A rechargeable electrochemical cell comprising an alkali metal anode, a cathode where at least one side reaction occurs, a non-aqueous electrolyte,
   and a metallic coating that inhibits said side reaction on the cathode.

2. The electrochemical cell of claim 1 wherein said alkali metal is lithium.

3. The electrochemical cell of claim 1 wherein said cathode comprises a transition metal sulfide.

4. The electrochemical cell of claim 3 wherein said transition metal sulfide is selected from the group consisting of TiS$_2$, TiS$_3$, MoS$_2$, MoS$_3$, NbS$_2$, NbS$_3$, V$_2$S$_5$, and V$_x$Cr$_{1-x}$S$_2$.

5. The electrochemical cell of claim 4 wherein said transition metal sulfide is TiS$_2$.

6. The electrochemical cell of claim 1 wherein said protective coating comprises a metal that is essentially unreactive with said electrolyte in the operating voltage range of said cathode.

7. The electrochemical cell of claim 6 wherein said metal is selected from a group consisting of Mg, Sc, Ti, V, Nb, Cr, Mo, Mn, Fe, Co, Ni, Cu, Ag, Au, Zn, Cd, Al, In, Ge, Sn, Pb, As, and Sb.

8. The electrochemical cell of claim 7 wherein said metal is Al.

9. The electrochemical cell of claim 1 wherein said electrolyte comprises a non-aqueous solvent and a salt.

10. The electrochemical cell of claim 9 wherein said salt is a lithium salt.

11. The electrochemical cell of claim 10 wherein said lithium salt is selected from the group consisting of LiAsF$_6$ and LiPF$_6$.

12. A rechargeable electrochemical cell comprising an anode, a cathode, and an electrolyte, said cathode comprising,
    an active cathode material with a surface at which at least one side reaction occurs,
    on the outer surface of said cathode material, a protective coating that inhibits said reaction without preventing discharge of said cathode, wherein said electrolyte comprises a non-aqueous solvent and a lithium salt selected from the group consisting of LiAsF$_6$ and LiPF$_6$, wherein said anode comprises lithium; said active cathode material is a transition metal sulfide; and said protective coating comprises a metal selected from the group consisting of Mg, Sc, Ti, V, Nb, Cr, Mo, Mn, Fe, Co, Ni, Cu, Ag, Au, Zn, Cd, Al, In, Ge, Sn, Pb, As, and Sb.

13. The electrochemical cell of claim 12 wherein said transition metal sulfide is TiS$_2$.

14. The electrochemical cell of claim 13 wherein said protective coating is Al.

* * * * *